United States Patent
Maeda et al.

(10) Patent No.: US 7,991,286 B2
(45) Date of Patent: Aug. 2, 2011

(54) OPTICAL TRANSMISSION APPARATUS

(75) Inventors: Yoshiyuki Maeda, Fukuoka (JP);
Hironori Kadota, Fukuoka (JP); Taku Yoshida, Fukuoka (JP); Yoshinobu Matsukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 756 days.

(21) Appl. No.: 12/034,691

(22) Filed: Feb. 21, 2008

(65) Prior Publication Data
US 2008/0226299 A1 Sep. 18, 2008

(30) Foreign Application Priority Data
Mar. 16, 2007 (JP) .................................. 2007-069511

(51) Int. Cl.
*H04B 10/00* (2006.01)
(52) U.S. Cl. ............. 398/4; 398/167.5; 340/2.26; 700/3
(58) Field of Classification Search .................. 398/3–4, 398/167.5; 700/3
See application file for complete search history.

(56) References Cited

U.S. PATENT DOCUMENTS
| | | | | |
|---|---|---|---|---|
| 7,310,333 B1 * | 12/2007 | Conklin et al. | ............... | 370/388 |
| 2005/0243712 A1 * | 11/2005 | MacKinnon et al. | .......... | 370/216 |
| 2008/0118244 A1 * | 5/2008 | Nakada | ........................... | 398/59 |

FOREIGN PATENT DOCUMENTS
JP 61128302 6/1986
JP 08202672 8/1996
* cited by examiner

*Primary Examiner* — Leslie Pascal
(74) *Attorney, Agent, or Firm* — Fujitsu Patent Center

(57) ABSTRACT

An optical transmission apparatus includes redundant line cards each having a plurality of ports, a hardware unit and a CPU. The hardware unit obtains failure information on redundant lines for each port. The CPU determines switching control of the redundant lines based on the failure information. Then, the hardware unit switches the redundant lines based on the switching control determined by the CPU, so as to transmit an SDH/SONET optical signal in a ring network. The CPU of one of the line cards is set as a master CPU on the corresponding line card to control switching of the redundant lines. Further, the CPU of the other line card is set as a slave CPU.

5 Claims, 16 Drawing Sheets

|  | FIRST LIU | SECOND LIU |
|---|---|---|
| FIRST PORT | MASTER CPU | SLAVE CPU |
| SECOND PORT | MASTER CPU | SLAVE CPU |
| THIRD PORT | MASTER CPU | SLAVE CPU |
| FOURTH PORT | MASTER CPU | SLAVE CPU |
| FIFTH PORT | SLAVE CPU | MASTER CPU |
| SIXTH PORT | SLAVE CPU | MASTER CPU |
| SEVENTH PORT | SLAVE CPU | MASTER CPU |
| EIGHTH PORT | SLAVE CPU | MASTER CPU |

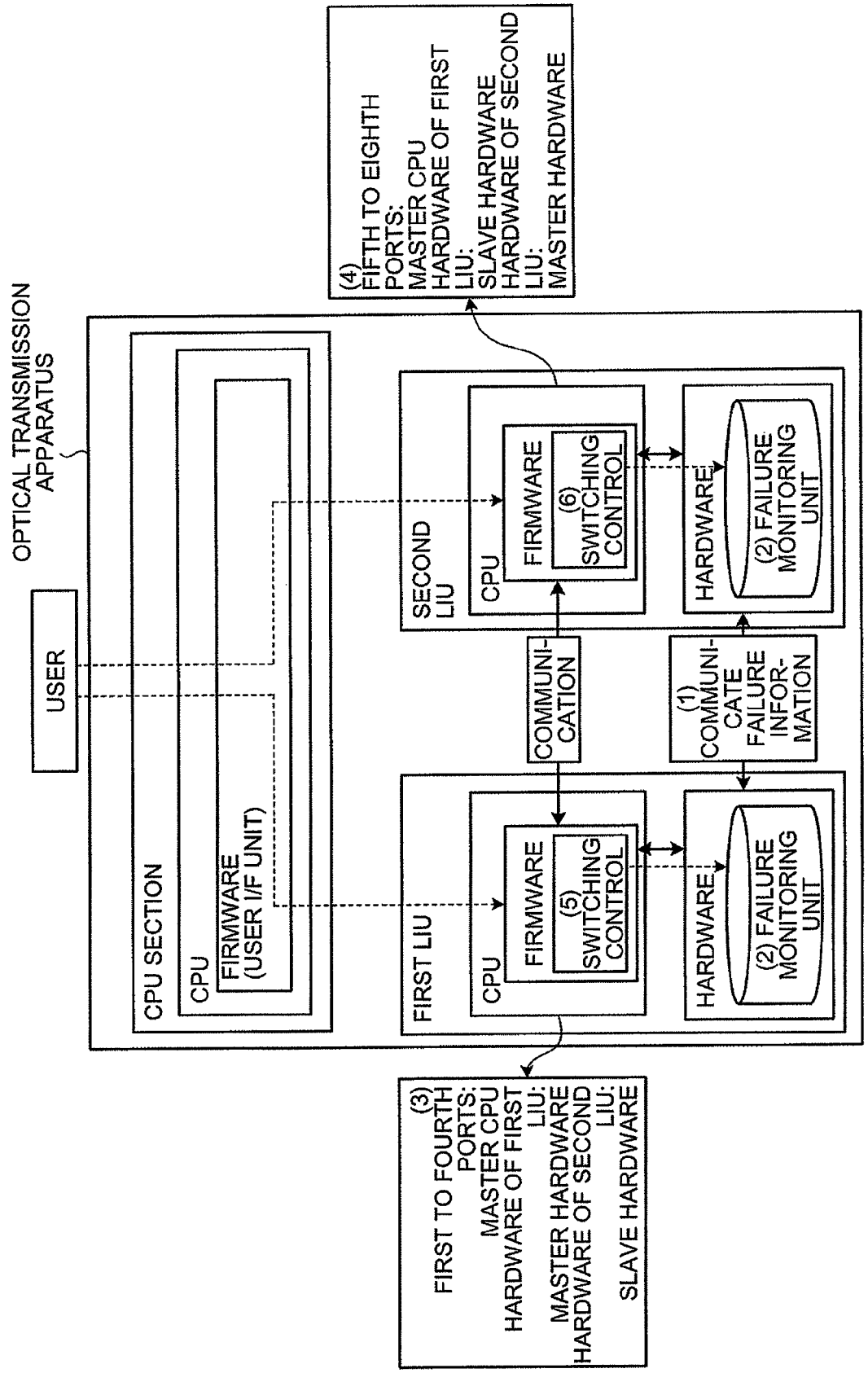

FIG.3A

| PORT NUMBER | 1 | 2 | 3 | 4 | 5 | 6 | 7 | 8 |
|---|---|---|---|---|---|---|---|---|
| STATUS | M | M | M | M | S | S | S | S |

FIG.3B

| PORT NUMBER | 1 | 2 | 3 | 4 | 5 | 6 | 7 | 8 |
|---|---|---|---|---|---|---|---|---|
| STATUS | S | S | S | S | M | M | M | M |

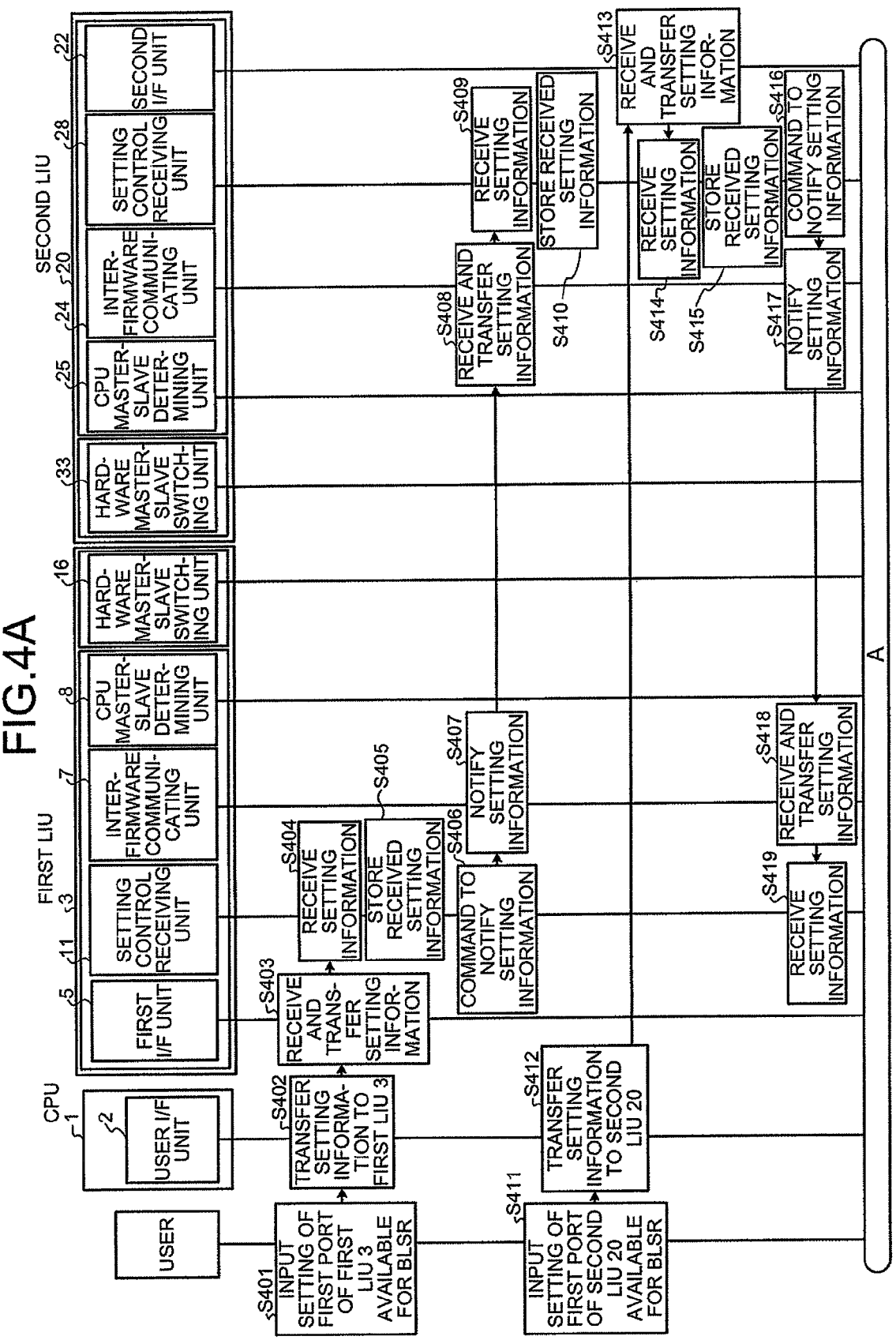

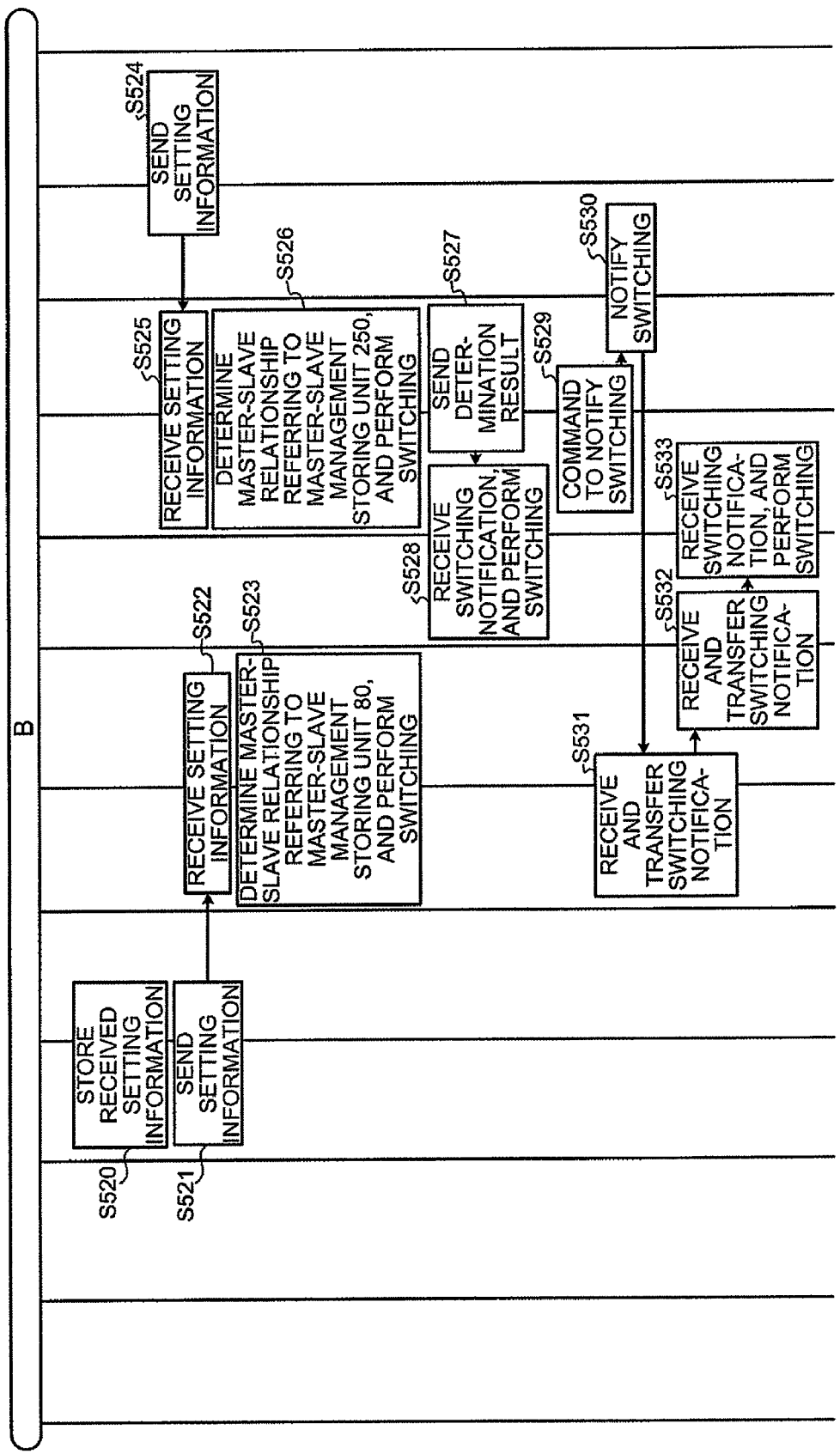

OPTICAL TRANSMISSION APPARATUS

BACKGROUND OF THE INVENTION

1. Field of the Invention

The present invention relates to an optical transmission apparatus.

2. Description of the Related Art

In a redundant network configured according to a standard of optical transmission technology such as Synchronous Digital Hierarchy (SDH) or Synchronous Optical Network (SONET), a working line and a protection line are provided between two optical transmission apparatuses. Further, an Automatic Protection Switch (APS) function is provided for switching the working line to the protection line upon the occurrence of failure on the working line, so as to quickly respond to communication failure.

An example of such network configuration implementing the APS function is a network configuration called "1+1 APS" shown in FIGS. 7A to 7D. FIGS. 7A to 7D are schematic drawings for explaining the 1+1 APS.

In the "1+1 APS" as shown in FIGS. 7A to 7D, redundant lines are provided as a working line and a protection line between two optical transmission apparatuses. In the normal operation shown in FIG. 7A, an optical signal from an optical transmission apparatus on the left is forwarded to an optical transmission apparatus on the right over both the working line and the protection line, and a selector (see "SEL" of FIG. 7A) of the right optical transmission apparatus at the receiving end controls switching so as to receive the optical signal only from the working line. An optical signal from the right optical transmission apparatus is forwarded to the left optical transmission apparatus over both the working line and the protection line, and a selector of the left optical transmission apparatus at the receiving end controls switching so as to receive the optical signal only from the working line.

In the "1+1 APS", upon occurrence of communication failure on the working line, a selector of an optical transmission apparatus controls switching so as to receive an optical signal from a neighboring optical transmission apparatus over the protection line. Specifically, as shown in FIG. 7B, switching is performed at the receiving end so that an optical signal sent over the protection line is received as well. In this way, communication failure can be quickly responded only by performing switching control at the receiving end.

After recovery from the communication failure, normal operation may be performed using the protection line as a working line and the recovered working line as a protection line as shown in FIG. 7C, or switching may be performed back again as shown in FIG. 7D.

Another example of the network configuration implementing the APS function is a ring network as shown in FIGS. 8A and 8B, so-called "Bidirectional Line Switch Ring (BLSR)" that performs switching control of the "1+1 APS". FIGS. 8A and 8B are schematic drawings for explaining the BLSR.

In the normal operation of the "BLSR", an optical signal is communicated using only one way of a communication path as a working direction. When communication failure occurs, the path direction used in the normal operation is switched to the reverse direction (protection direction) so that the communication failure can be quickly responded. As shown in FIG. 8A, for example, in the normal operation of the ring network including four optical transmission apparatuses, i.e. a node 1 to a node 4, an optical signal is sent from the node 4 to a node 2 using a path passing through a node 3.

In this state, when communication failure occurs between the node 4 and the node 3 as shown in FIG. 8B, the node 3 sends information of the communication failure to the node 4 through the node 2 and the node 1. In response to the information of the failure occurrence, the node 4 sends an optical signal to the node 2 using a reverse path direction (protection direction) of the current path direction. Specifically, the optical signal from the node 4 reaches the node 3 through the node 1 and the node 2, and turns around at the node 3 to be sent to the node 2.

In the "1+1 APS" or the "BLSR", an optical transmission apparatus performs switching control of the APS function by exchanging with a neighboring optical transmission apparatus APS bytes (K1/K2 bytes) stored in the overhead of an SDH or a SONET optical signal. For example, when an optical transmission apparatus at the receiving end detects a failure such as a signal failure (SF) or signal degradation (SD), the apparatus notifies information of the failure to a neighboring apparatus using APS bytes storing such information, and performs switching control.

The switching control is performed within 50 milliseconds as required by the GR253 standard.

An example of an architecture realizing the "BLSR" is a centralized CPU (central processing unit) architecture as shown in FIG. 9. FIG. 9 is a schematic of a centralized CPU architecture.

As shown in FIG. 9, the centralized CPU architecture has a redundant configuration including: a CPU section that controls monitoring an entire optical transmission apparatus; and line interface units (LIUs), i.e., a WEST LIU and an EAST LIU, each having an interface function for external lines corresponding to working and protection lines.

Each of the WEST LIU and the EAST LIU includes hardware units. The hardware receives APS bytes over the working and the protection lines, and notifies information of SF and SD to the CPU section. The hardware also performs switching in response to a command from the CPU section. Each of the WEST LIU and the EAST LIU has a plurality of ports corresponding to the working and the protection lines.

In the centralized CPU architecture, firmware operating in a CPU of the CPU section collects information of the APS bytes from the WEST LIU and the EAST LIU, so as to control switching.

For example, when the hardware of the WEST LIU serving as an interface for the working line detects SF as a switching factor, the hardware notifies the occurrence of the SF to the firmware of the CPU section (see (1) shown in FIG. 9). The firmware of the CPU section then performs an APS determination process (switching determination process), based on the received SF information and the information of APS bytes from the WEST LIU (or a second LIU see (2) shown in FIG. 9), so as to control switching of the hardware in the WEST LIU and the EAST LIU (see (3) shown in FIG. 9). In this way, switching is performed as shown in FIG. 8B.

In the centralized CPU architecture, when the number of ports of an LIU increases or when a plurality of switching factors occur concurrently, the CPU section is congested with the APS determination process performed by the firmware, causing a problem that switching cannot be performed quickly for such a communication failure.

The problem is addressed with an architecture realizing a "BLSR", such as a decentralized or distributed CPU architecture shown in FIG. 10. FIG. 10 is a schematic of a distributed CPU architecture.

As with the centralized CPU architecture, the distributed CPU architecture includes a CPU section, and a WEST LIU and an EAST LIU each having an interface function for external lines corresponding to the working and the protection lines, as shown in FIG. 10. Each of the WEST LIU and the EAST LIU includes a distributed CPU. Firmware operating in the CPU of one LIU collects information of APS bytes, and communicates it with firmware of the other LIU. Accordingly, information of both LIUs is shared to control switching.

In this arrangement, switching determination needs to be performed at either one of the redundant LIUs by referring to information of APS bytes sent over both the working and the protection lines. For example, a user of an optical transmission apparatus sets the CPU section to perform switching determination at the EAST LIU. The EAST LIU, when receiving the setting information through the firmware (user I/F section) of the CPU section, serves as a master CPU and dominantly controls switching of the hardware.

In the distributed CPU architecture, for example, when the hardware of the WEST LIU serving as an interface for the working line detects SF as a switching factor, it notifies the occurrence of the SF to the firmware in the CPU of the WEST LIU (see (1) shown in FIG. 10). The firmware of the WEST LIU notifies the occurrence of the switching factor to the firmware in the CPU (master CPU) of the EAST LIU by firmware communication (see (2) shown in FIG. 10). The firmware of the EAST LIU performs the APS determination process (switching determination process), based on the switching factor (SF) received from the WEST LIU and the information of APS bytes from the EAST LIU (see (3) shown in FIG. 10).

The firmware of the EAST LIU provides a result of the APS determination process as a switching notification to the firmware of the WEST LIU by firmware communication (see (4) shown in FIG. 10). Based on the result determined by the firmware of the EAST LIU, the firmware of the WEST LIU and the firmware of the EAST LIU control switching of the hardware of their respective LIUs (see (5) shown in FIG. 10). As such, switching is controlled based on the determination made by the CPU of the EAST LIU serving as a master CPU, and thus performed, for example, as shown in FIG. 8B.

Japanese Patent Application Publication No. H6-30002 discloses a programmable controller in which data is transferred by direct memory access (DMA) from a memory of a master CPU to a memory of a slave CPU, allowing the CPUs to share information Japanese Patent Application Laid-open No. H8-202672 discloses a distributed multiprocessing system that includes processor units (a single master unit and a plurality of slave units) each including a CPU and a memory, and that allows the CPUs to share information by transferring data from the master unit to the slave units via a VERSA module Eurocard (VME) bus.

With the conventional technology, when failures occur concurrently on a plurality of ports of an LIU and thus switching is controlled, increased loads are placed on the process performed by the master CPU. As a result, switching cannot be performed quickly.

Specifically, in a configuration shown in FIGS. 11A and 11B, when switching control of the "BLSR" is performed by only a master CPU of an LIU, switching cannot be performed quickly within 50 milliseconds as required by the GR253 standard. FIGS. 11A and 11B are schematics for explaining a problem in a conventional configuration.

As shown in FIG. 11A, for example, when an LIU of an optical transmission apparatus (a distributed CPU architecture) realizing the "BLSR" has a redundant configuration including five physical ports, switching needs to be controlled by only a master CPU of one LIU based on APS information in combination of all the five ports.

When the "BLSR" is realized in a ring network including 16 nodes (each node represents an optical transmission apparatus) as shown in FIG. 11B, for example, a master CPU installed in an LIU of a node 1 having detected SF (signal failure) information of an optical signal from a node 16 completes switching control by performing a plurality of steps: controlling switching at the node 1 while providing a switching request to a node 2 to the node 16 and receiving a switching response from the node 2 to the node 16. Thus, the master CPU is required to have high processing capacity.

With the related art, for failures concurrently occurring on not more than four physical ports, for example, switching can be performed within 50 milliseconds by only a master CPU of one LIU. With an LIU having five or more physical ports as shown in FIG. 11A, however, switching cannot be performed within 50 milliseconds by only the master CPU to respond to failures concurrently occurring on all the physical ports.

SUMMARY OF THE INVENTION

It is an object of the present invention to at least partially solve the problems in the conventional technology.

According to an aspect of the present invention, an optical transmission apparatus for transmitting an optical SDH/SONET signal in a ring network, comprising a first line card and a second line card, each including a plurality of ports connected to a redundant line having a working line and a protection line, a hardware unit, a CPU, and a master-slave CPU distribution setting unit. The hardware unit obtains failure information on the redundant line for each of the ports. The CPU determines switching control of the redundant line for each of the ports based on the failure information obtained by the hardware unit, and thereby the hardware unit switches the redundant line based on the switching control determined by the CPU. The master-slave CPU distribution setting unit sets the CPU of one of the first line card and the second line card as a master CPU that determines the switching control of the redundant line, and sets the CPU of the other of the first line card and the second line as a slave CPU, for each set of the ports.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1D is a schematic of the overview and features of the optical transmission apparatus shown in FIGS. 1A to 1C;

FIGS. 3A and 3B are schematics of a master-slave management storing unit shown in FIG. 2;

FIGS. 4A and 4B are charts of processes from setting to normal operation in the optical transmission apparatus shown in FIG. 2;

FIGS. 5A and 5B are charts of processes from setting to normal operation in the optical transmission apparatus shown in FIG. 2;

DETAILED DESCRIPTION OF THE PREFERRED EMBODIMENTS

Exemplary embodiments of an optical transmission apparatus according to the present invention will now be described in detail referring to the accompanying drawings. The description starts from an overview and features of an optical transmission apparatus according to a first embodiment of the present invention, and moves to a configuration and a procedure of the optical transmission apparatus according to the first embodiment, advantages of the first embodiment, and finally another embodiment.

Referring to FIGS. 1A to 1D, the following specifically describes main features of an optical transmission apparatus according to the first embodiment. FIGS. 1A to 1D are schematics of an overview and features of the optical transmission apparatus according to the first embodiment.

In the optical transmission apparatus according to the first embodiment, a hardware unit mounted on a redundant LIU having a plurality of ports obtains, from sets of the ports at one time, failure information on redundant lines including working and protection lines. Based on the received failure information, a CPU mounted on the redundant LIU determines switching control of the redundant lines with regard to the sets of the ports, and the hardware switches the redundant lines with regard to the sets of the ports based on the switching control determined by the CPU. In this way, an SDH/SONET optical signal is transmitted over a ring network. The "LIU" may be referred to as a "line card".

Figure 10:
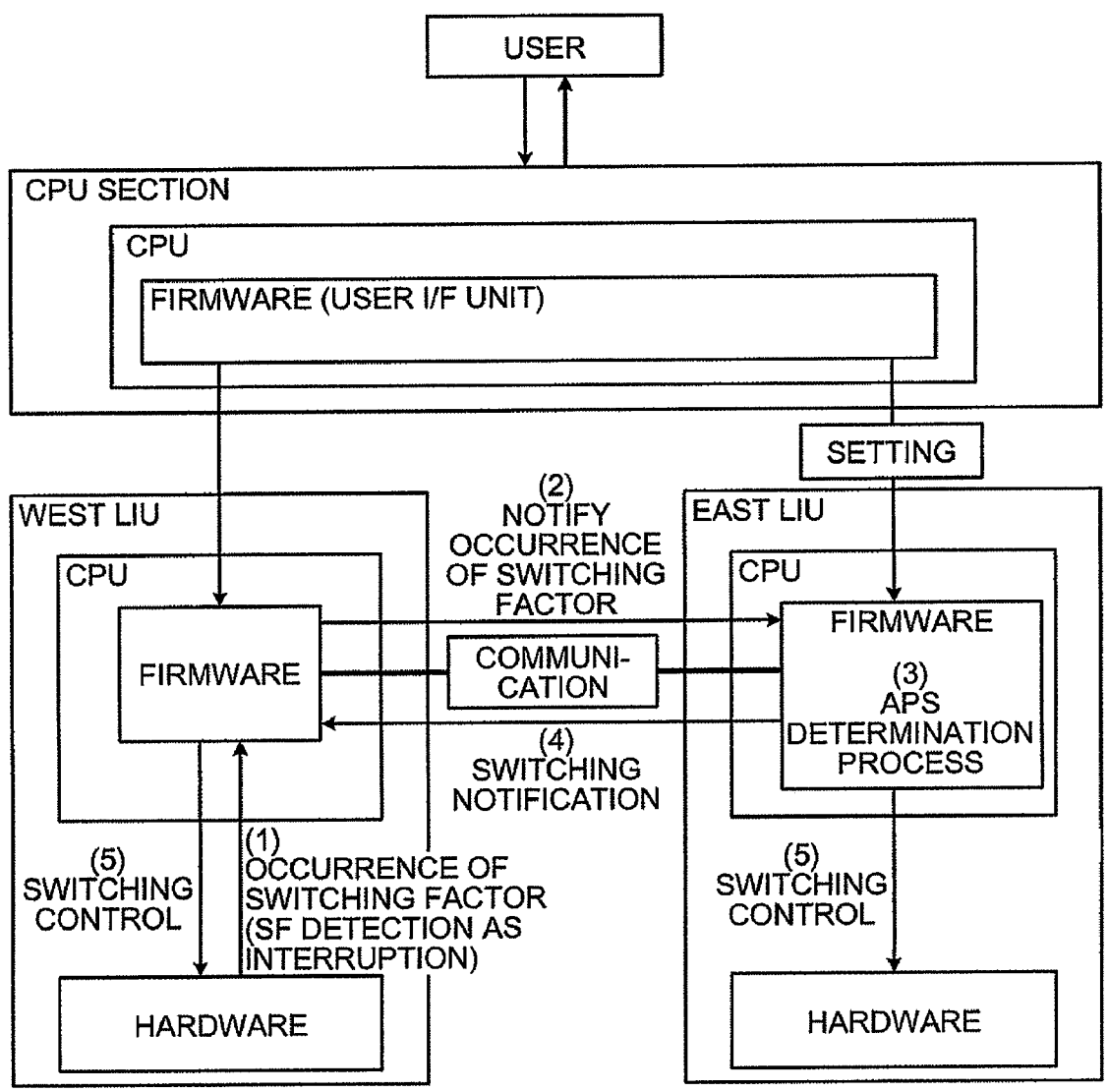
FIG. 10 is a schematic of a distributed CPU architecture.
Figure 11A:
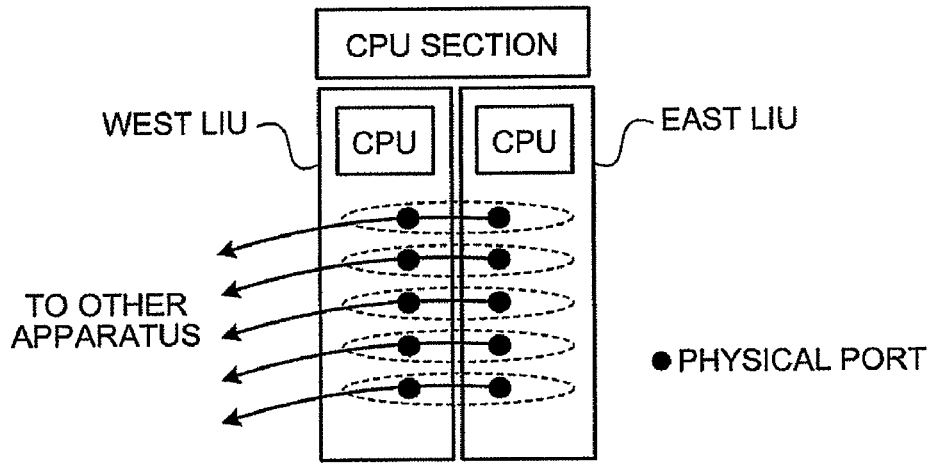
FIGS. 11A and 11B are schematics for explaining a problem with related art.
Figure 11B:
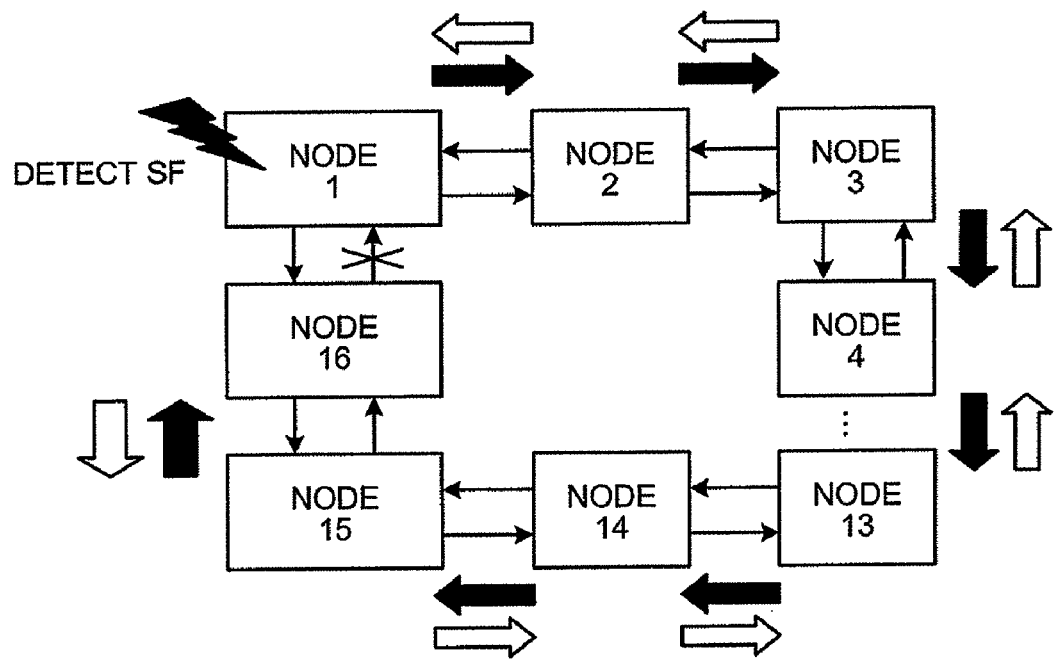
Figure 11B:
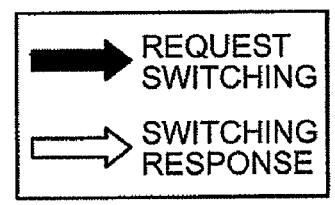

Specifically, an optical transmission apparatus according to the first embodiment has a distributed CPU architecture shown in FIG. 10. Further, redundant first and second LIUs each have first to eighth ports as shown in FIG. 1A for example, and one LIU transmits an optical signal to the other LIU over the ring network.

The optical transmission apparatus according to the first embodiment has such a main feature as being capable of performing quick switching to respond to failures concurrently occurring on a plurality of ports. The main feature is briefly described as follows. In the optical transmission apparatus according to the first embodiment, a master CPU mounted on a redundant LIU and determining switching control of redundant lines is distributed to a plurality of ports. Further, at a predetermined port, corresponding to a CPU set as a master CPU in an LIU, a CPU in a neighboring LIU is set as a slave CPU.

Figures 1A, 1B:
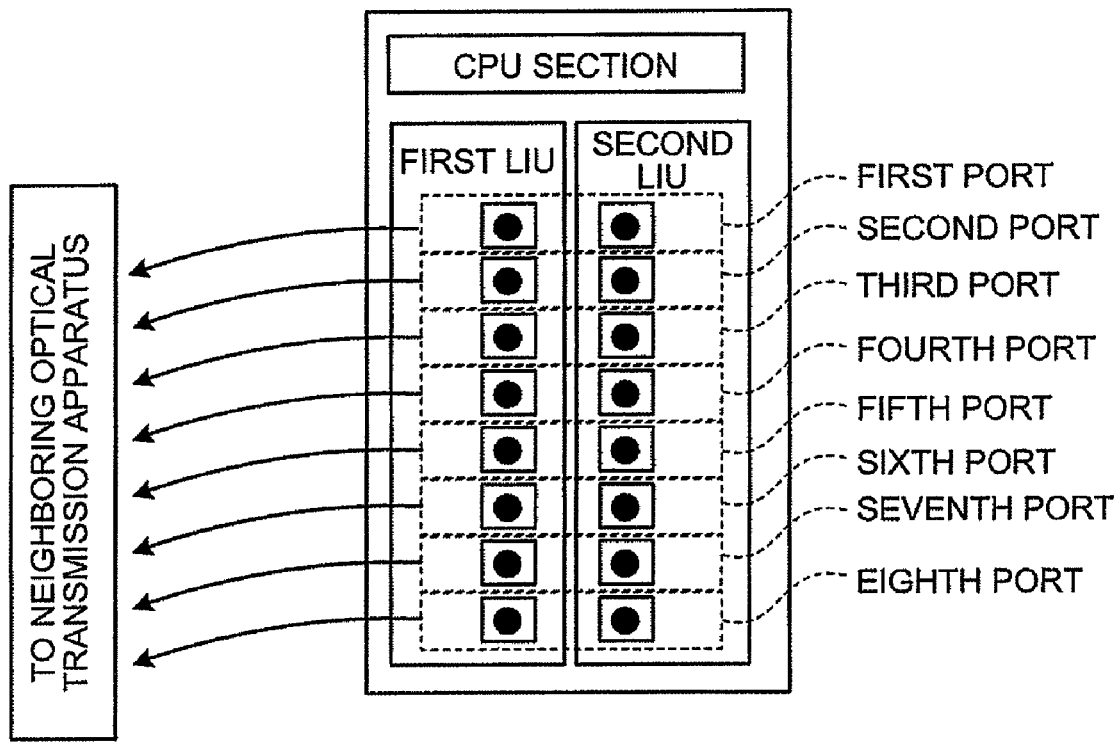
FIGS. 1A to 1C are schematics of an overview and features of an optical transmission apparatus according to a first embodiment of the present invention.

Specifically, as shown in FIG. 1B, for example, at first to fourth ports, a CPU in the first LIU serves as a master CPU and controls switching, whereas at fifth to eighth ports, a CPU in the second LIU serves as a master CPU and controls switching. At the fifth to the eighth ports, the CPU in the first LIU serves as a slave CPU, whereas at the first to the fourth ports, the CPU in the second LIU serves as a slave CPU.

Figure 1C:
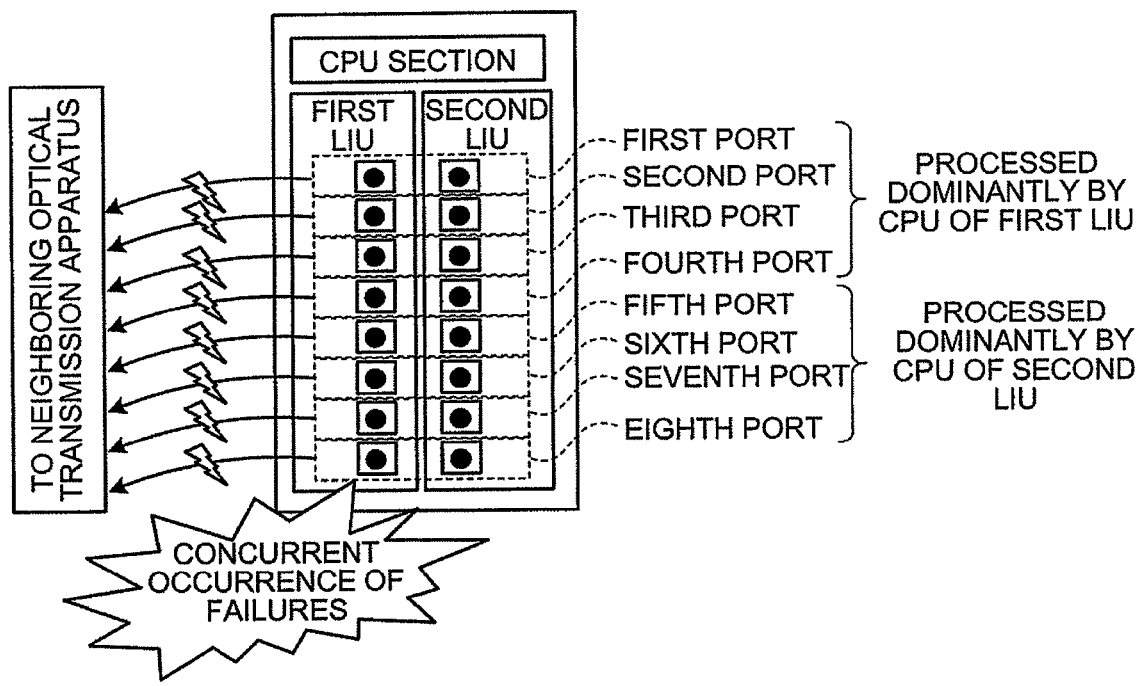

In the optical transmission apparatus according to the first embodiment, a CPU set as a master CPU dominantly determines switching control based on failure information from ports corresponding to the master CPU. As shown in FIG. 1C for example, when failures occur on all the first to the eighth ports concurrently, at the first to the fourth ports, the CPU in the first LIU dominantly controls switching as a master CPU, whereas at the fifth to the eighth ports, the CPU in the second LIU dominantly controls switching as a master CPU. For example, if the CPU in the first LIU has completed switching control as a master CPU at the first to the fourth ports but switching control at the fifth to the eighth ports has not been completed by the CPU in the second LIU, the CPU in the first LIU may continue to perform the switching control as a slave CPU.

In the optical transmission apparatus according to the first embodiment, between pieces of hardware in redundant LIUs, hardware in one redundant LIU communicates obtained failure information to hardware in the other line card.

Specifically, inter-hardware communication is performed such that the hardware of the first LIU communicates obtained failure information included in APS bytes to the hardware of the second LIU, and that the hardware of the second LIU communicates obtained failure information included in APS bytes to the hardware of the first LIU (see (1) shown in FIG. 1D).

In the optical transmission apparatus according to the first embodiment, hardware in each redundant LIU stores therein obtained failure information and failure information received from hardware in a neighboring LIU.

Specifically, hardware in each of the first and the second LIUs includes a failure monitoring unit that stores therein failure information obtained by the hardware. Failure information obtained by hardware in each of the first and the second LIUs is updated and shared therebetween by inter-hardware communication (see (2) shown in FIG. 1D).

In the optical transmission apparatus according to the first embodiment, a CPU set as a master CPU at a predetermined port sets: hardware working under the master CPU to be master hardware at the predetermined port; and hardware working under a CPU determined as a slave CPU at the predetermined port to be slave hardware at the predetermined port.

Specifically, at the first to the fourth ports, the CPU set as a master CPU in the first LIU sets: hardware working under the master CPU to be master hardware at the first to the fourth ports; and hardware working under the CPU set as a slave CPU in the second LIU to be slave hardware at the first to the fourth ports (see (3) shown in FIG. 1D).

At the fifth to the eighth ports, the CPU set as a master CPU in the second LIU sets: hardware working under the master CPU to be master hardware at the fifth to the eighth ports; and hardware working under the CPU set as a slave CPU in the first LIU to be slave hardware at the fifth to the eighth ports (see (4) shown in FIG. 1D).

In the optical transmission apparatus according to the first embodiment, a CPU determined as a master CPU controls hardware set as master hardware to switch redundant lines. Specifically, as shown in (5) in FIG. 1D, at the first to the fourth ports, firmware operating in the CPU set as a master CPU in the first LIU dominantly controls switching, and the master hardware working under the master CPU switches the working and the protection lines according to the switching controlled by the firmware. As shown in (6) in FIG. 1D, at the fifth to the sixth ports, firmware operating in the CPU set as a master CPU in the second LIU dominantly controls switching, and accordingly the master hardware working under the master CPU switches the working and the protection lines.

With this arrangement, the optical transmission apparatus according to the first embodiment prevents, even when failure information included in APS bytes is received from all the ports for example, excess switching control on only either one of the redundant LIUs because the master CPU is distributed to the ports. Thus, switching can be performed quickly to respond to failures concurrently occurring on the ports, as described as the main feature.

Figure 2:
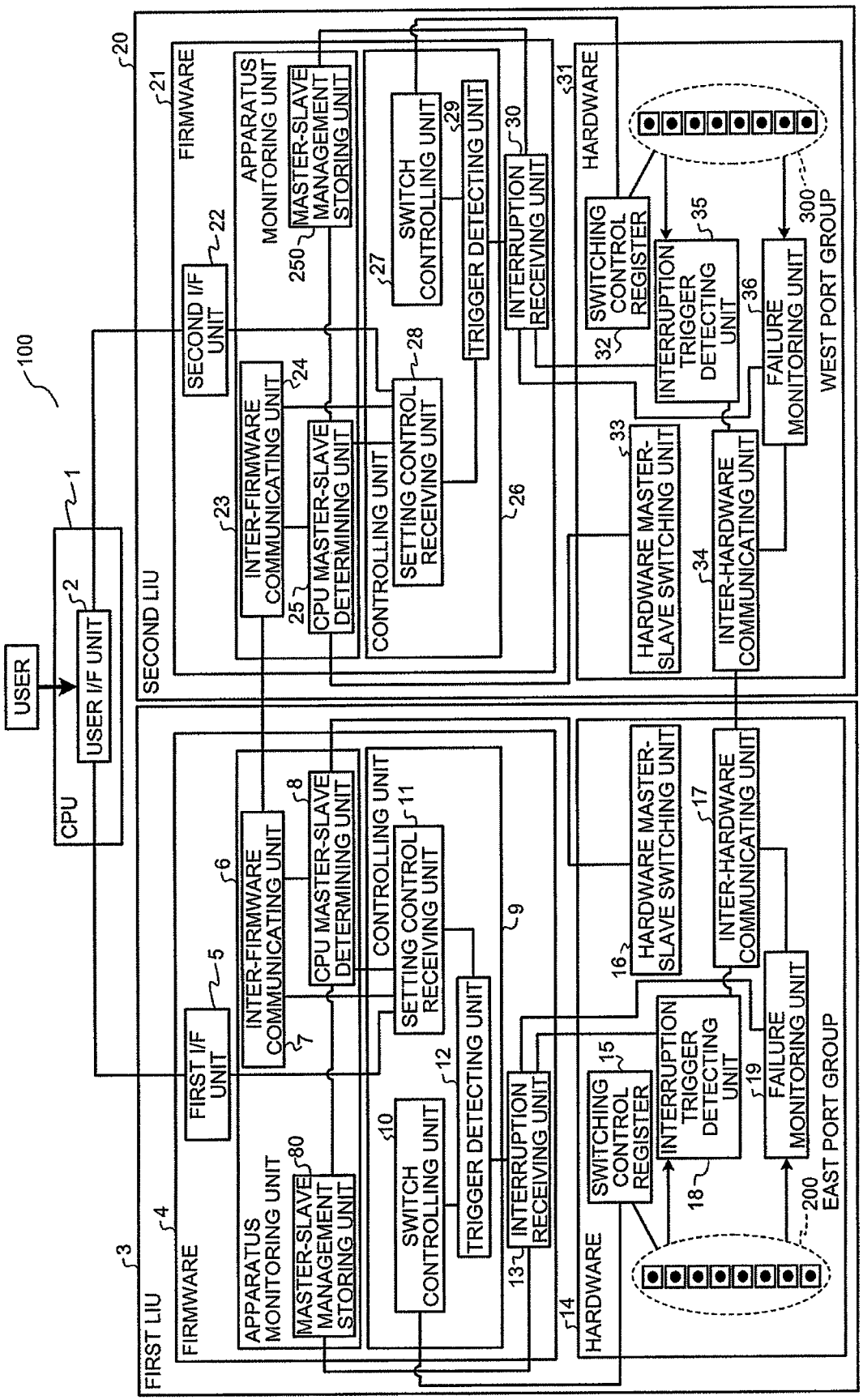
FIG. 2 is a configuration block diagram of the optical transmission apparatus shown in FIG. 1D.
Figure 4B:
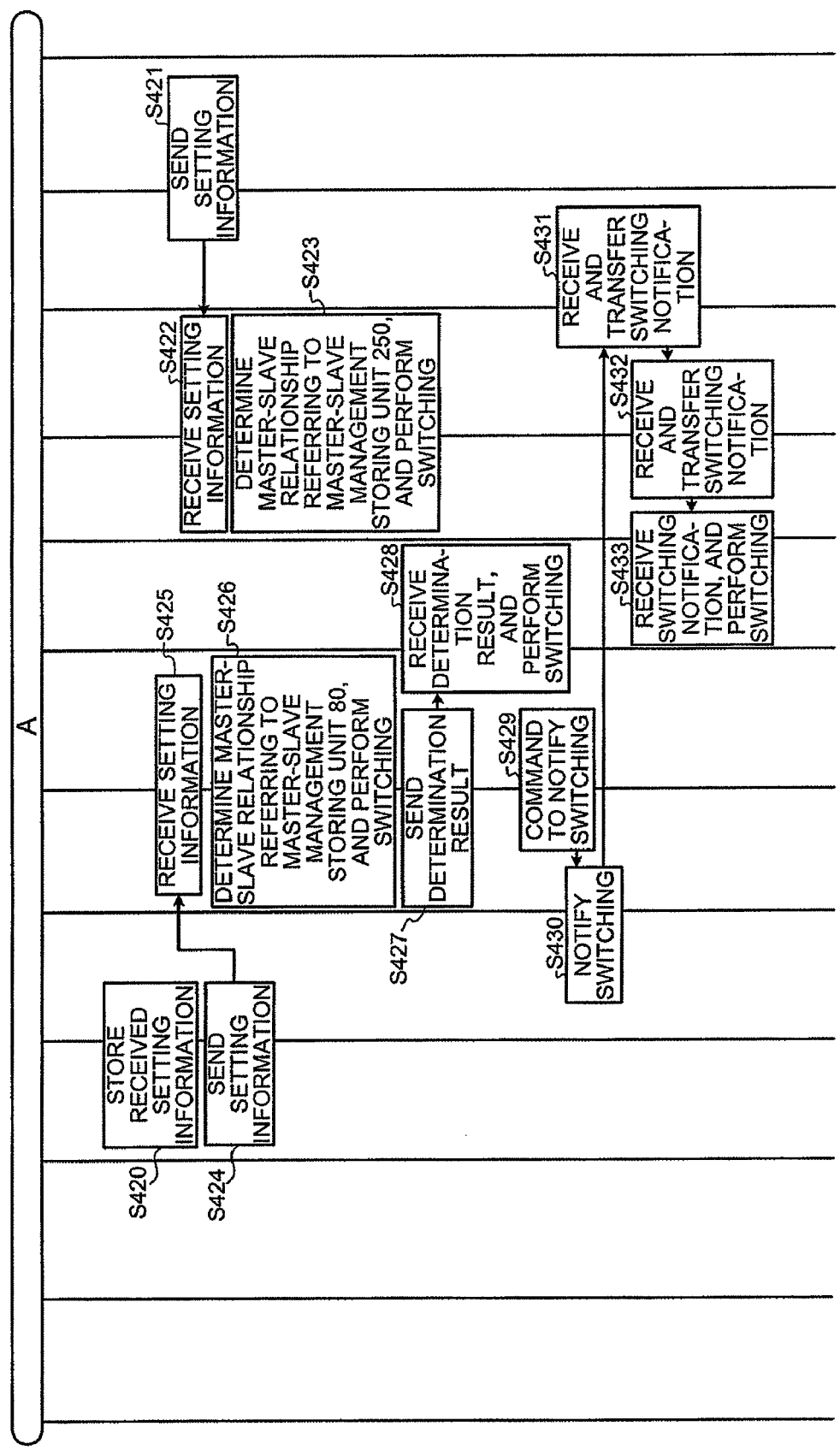
Figure 5A:
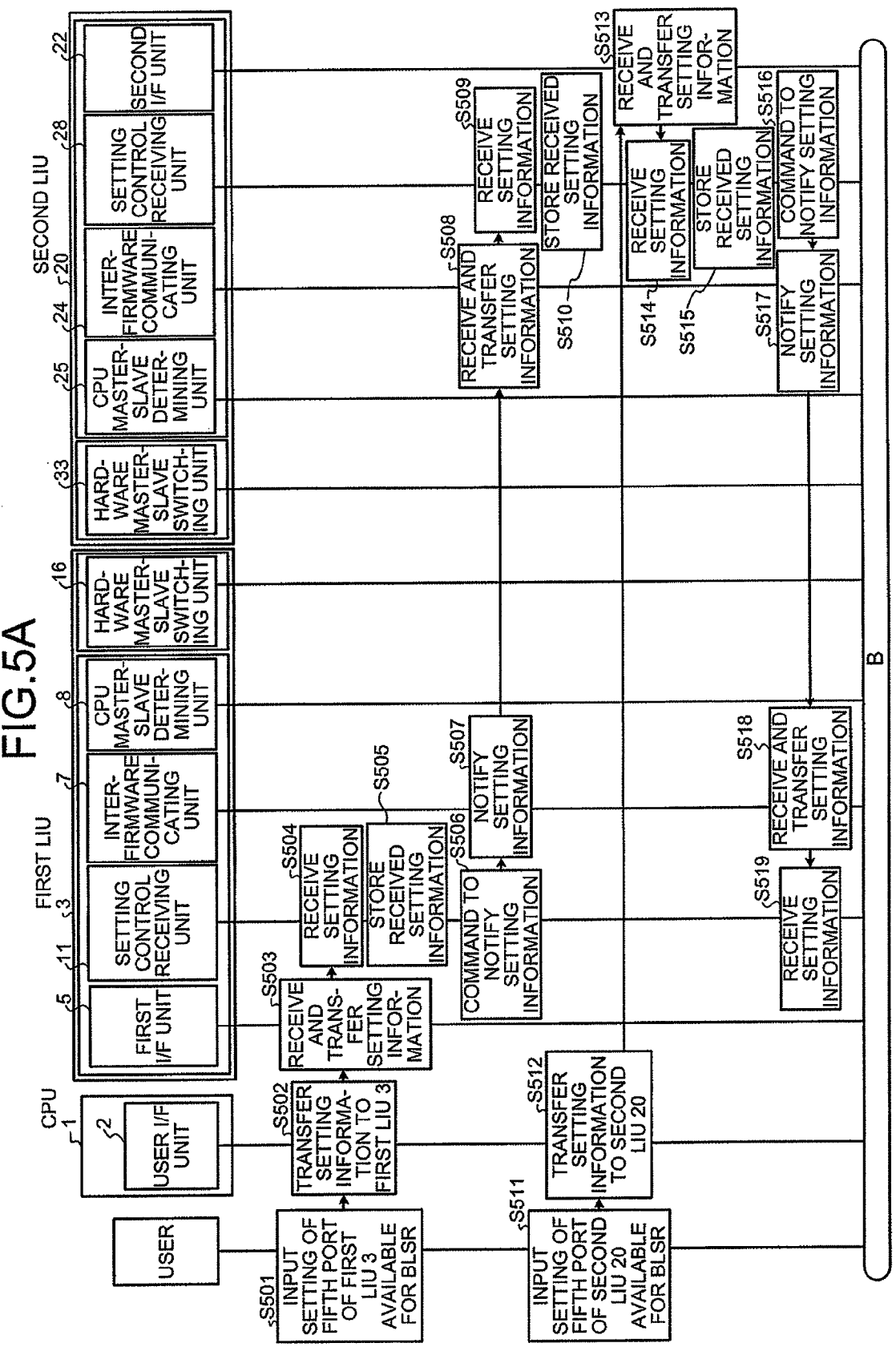

Referring to FIGS. 2 and 3, the following describes a structure of the optical transmission apparatus according to the first embodiment. FIG. 2 is a block configuration diagram of the optical transmission apparatus according to the first embodiment. FIGS. 3A and 3B are schematics of a master-slave management storing unit according to the first embodiment.

As shown in FIG. 2, an optical transmission apparatus 100 according to the first embodiment includes a CPU 1, and redundant LIUs: a first LIU 3 and a second LIU 20. In the first embodiment, the first LIU 3 is an EAST LIU and the second LIU 20 is a WEST LIU.

The CPU 1 includes a user I/F unit 2. The user I/F unit 2 controls to transfer, from a user of the optical transmission apparatus 100 to the first LIU 3 and the second LIU 20, setting information such as "setting of a first port of the first LIU 3 available for the BLSR" or "setting of a fifth port of the second LIU 20 available for the BLSR".

The first LIU 3 includes firmware 4 and hardware 14. The firmware 4 installed in a CPU mounted on the first LIU 3, operates to control switching of the lines. The hardware 14 mounted on the first LIU 3 detects failure information on the lines from an EAST port group 200, and performs switching according to the switching controlled by the firmware 4. The EAST port group 200 and a WEST port group 300 each include first to eighth physical ports as shown in FIGS. 1A to 1C, for example.

The firmware 4 includes a first I/F unit 5, an apparatus monitoring unit 6, a controlling unit 9, and an interruption receiving unit 13.

The first I/F unit 5 transfers information received from the user I/F unit 2 to a setting control receiving unit 11 described later.

The apparatus monitoring unit 6 includes an inter-firmware communicating unit 7, a CPU master-slave determining unit 8, and a master-slave management storing unit 80. The inter-firmware communicating unit 7 communicates various kinds of information (e.g., BLSR availability setting information) with firmware 21 of the second LIU 20. The CPU master-slave determining unit 8 determines a CPU containing the firmware 4 to be a master CPU or a slave CPU at each port, based on information received from the setting control receiving unit 11 and information stored in the master-slave management storing unit 80 (both described later). The CPU master-slave determining unit 8 may be referred to as a "master-slave CPU distribution setting unit".

The master-slave management storing unit 80 stores therein ports at which the CPU containing the firmware 4 controls switching as a master CPU. As shown in FIG. 3A, for example, the master-slave management storing unit 80 stores therein a setting that the CPU containing the firmware 4 serves as a master CPU(M) at the first to the fourth ports and serves as a slave CPU(S) at the fifth to the eighth ports.

A master-slave management storing unit 250 of the second LIU 20 stores therein ports at which a CPU containing the firmware 21 controls switching as a master CPU. As shown in FIG. 3B, for example, the master-slave management storing unit 250 stores therein a setting that the CPU containing the firmware 21 serves as a slave CPU(S) at the first to the fourth ports and serves as a master CPU(M) at the fifth to the eighth ports.

The controlling unit 9 includes a switch controlling unit 10, the setting control receiving unit 11, and a trigger detecting unit 12.

The setting control receiving unit 11 receives and stores therein setting information transferred from the first I/F unit 5, transfers setting information stored in the inter-firmware communicating unit 7 or the CPU master-slave determining unit 8, or receives and stores therein setting information transferred from the inter-firmware communicating unit 7.

The trigger detecting unit 12 receives failure information collected by the interruption receiving unit 13 (described later), determines switching, and notifies a result of the switching determination to the switch controlling unit 10 (described later).

The switch controlling unit 10 receives the result of the switching determination made by the trigger detecting unit 12, and commands a switching control register 15 (described later) to control switching.

The interruption receiving unit 13, when receiving an interruption notification from an interruption trigger detecting unit 18 (described later), collects, from a failure monitoring unit 19 (described later) by referring to the master-slave management storing unit 80, failure information with regard to ports at which the CPU in the first LIU is set as a master CPU (the first to the fourth ports). For example, the interruption receiving unit 13 collects information of SF (signal failure) or SD (signal degradation) at the first to the fourth ports.

The hardware 14 includes the switching control register 15, a hardware master-slave switching unit 16, an inter-hardware communicating unit 17, the interruption trigger detecting unit 18, and the failure monitoring unit 19.

The failure monitoring unit 19 receives and stores therein failure information included in APS bytes and sent from the EAST port group 200. Further, the failure monitoring unit 19 receives and stores therein failure information, sent from the WEST port group 300, received at a failure monitoring unit 36 constituting hardware 31 of the second LIU 20, and passed through the inter-hardware communicating unit 17 (described later). Each of the failure monitoring units 19 and 36 or their combination may be referred to as an "obtained failure information storing unit".

The inter-hardware communicating unit 17 communicates failure information obtained by hardware in each redundant LIU to hardware in a neighboring line card.

Specifically, the inter-hardware communicating unit 17 sends to an inter-hardware communicating unit 34 of the second LIU 20 failure information stored in the failure monitoring unit 19 and an interruption notification detected by the interruption trigger detecting unit 18 (described later). Further, the inter-hardware communicating unit 17 receives from the inter-hardware communicating unit 34 failure information stored in the failure monitoring unit 36 of the second LIU 20, and an interruption notification detected by an interruption trigger detecting unit 35 (described later).

As with the failure monitoring unit 19, the interruption trigger detecting unit 18 receives failure information included in APS bytes from the EAST port group 200, detects the failure information as an interruption notification, and sends the interruption notification to the interruption receiving unit 13. The interruption trigger detecting unit 18 sends the detected interruption notification to the second LIU 20 using the inter-hardware communicating unit 17.

The hardware master-slave switching unit 16 sets the hardware 14 to be either master hardware or slave hardware, based on a result determined by the CPU master-slave determining unit 8. The hardware master-slave switching unit 16 may be referred to as a "hardware master-slave setting unit".

The switching control register 15 performs switching according to a command from the switch controlling unit 10. For example, the switching control register 15 performs switching according to a command from the switch controlling unit 10, so as to receive an optical signal over a protection line, not a working line.

As shown in FIG. 2, the neighboring second LIU 20 has the same structure as the first LIU 3, and components of the second LIU 20 are the same as those of the first LIU 3 regarding functionality. Thus, description of such components will not be repeated here.

Specific operations of the components will be described below.

Figure 6A:
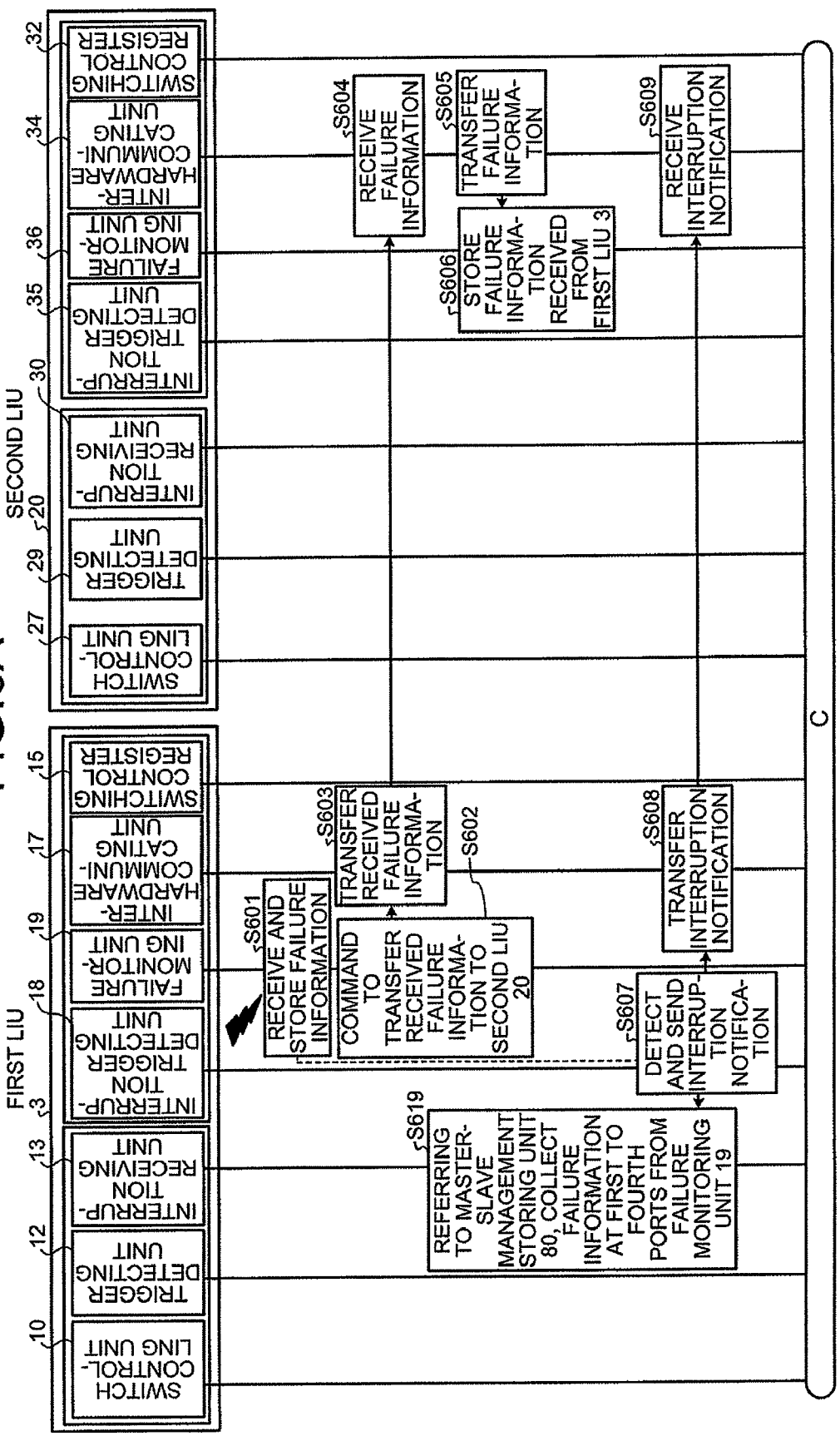
FIGS. 6A and 6B are charts of processes from concurrent occurrence of failures on a plurality of ports to switching control in the optical transmission apparatus shown in FIG. 2.
Figure 6B:
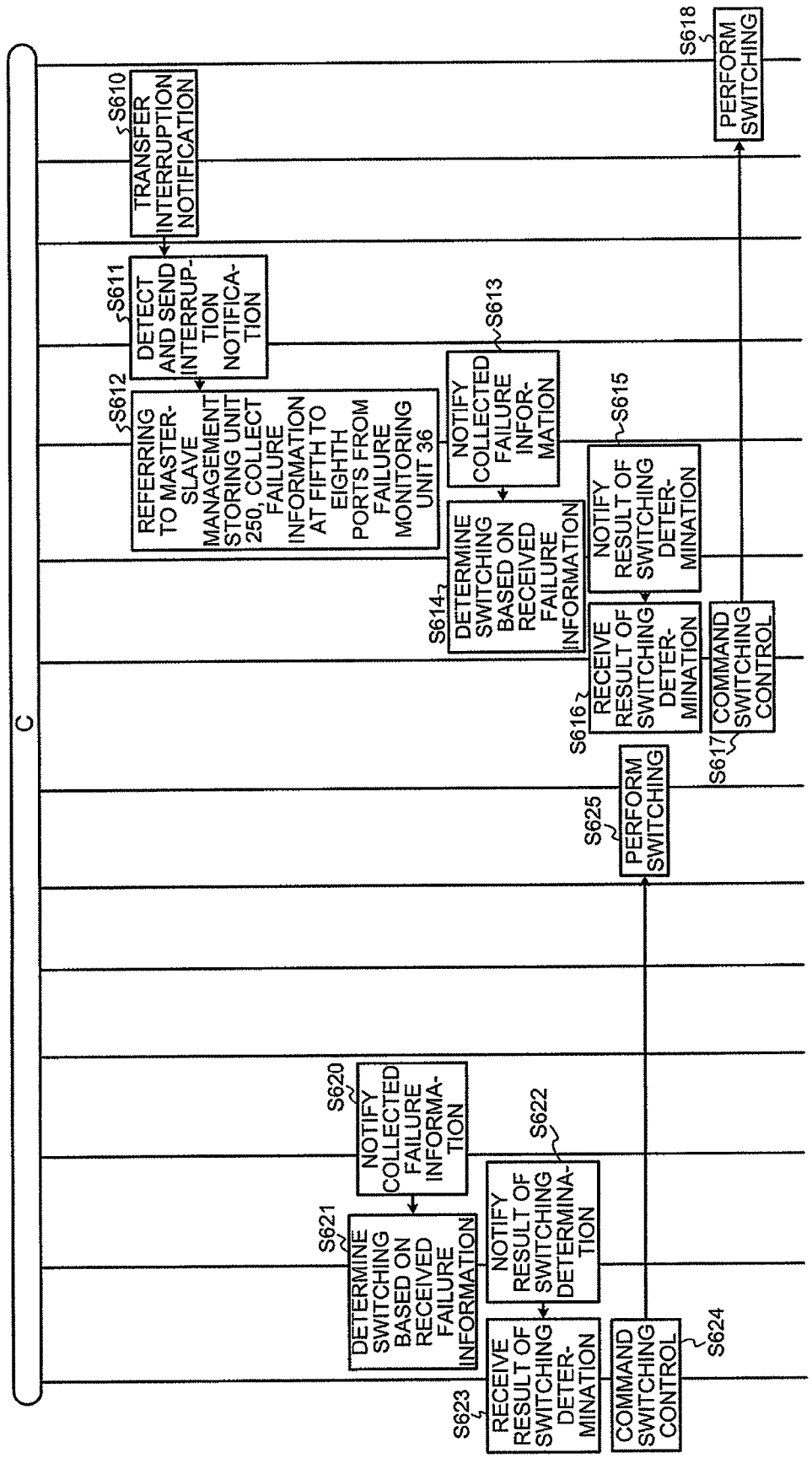
Figure 7A:
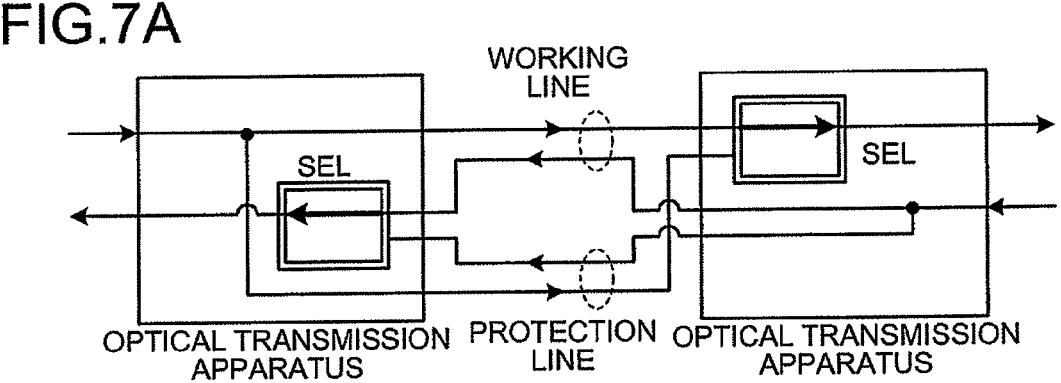
FIGS. 7A to 7D are schematics for explaining 1+1 APS.
Figure 7B:
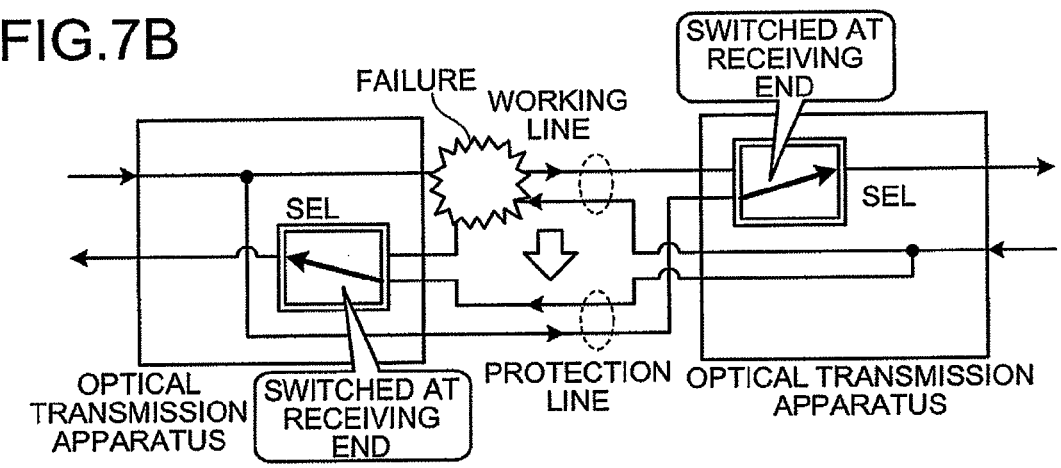
Figure 7C:
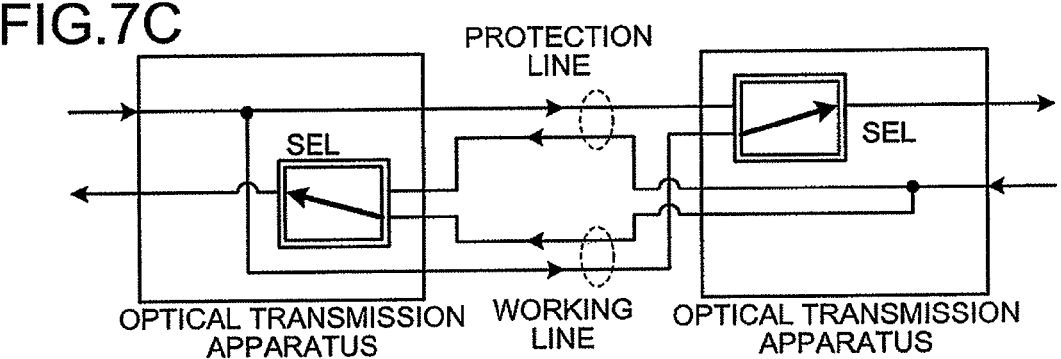
Figure 7D:
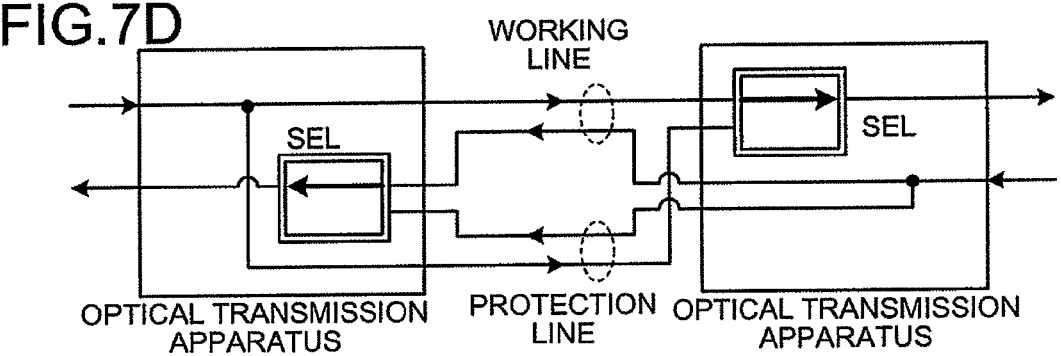
Figure 8A:
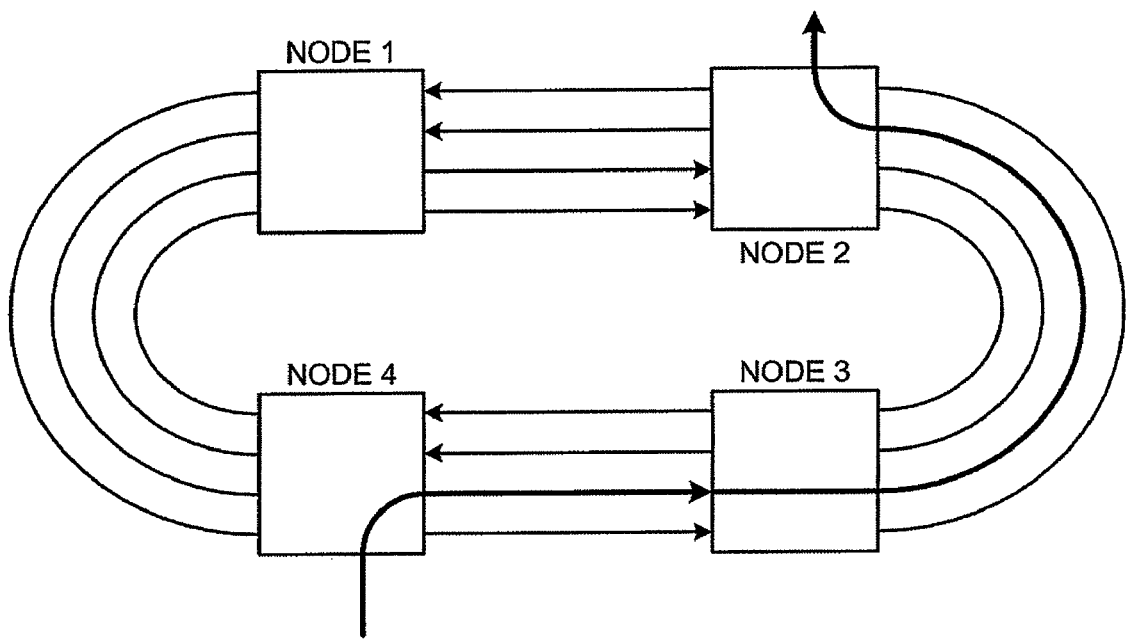
FIGS. 8A and 8B are schematics for explaining BLSR.
Figure 8B:
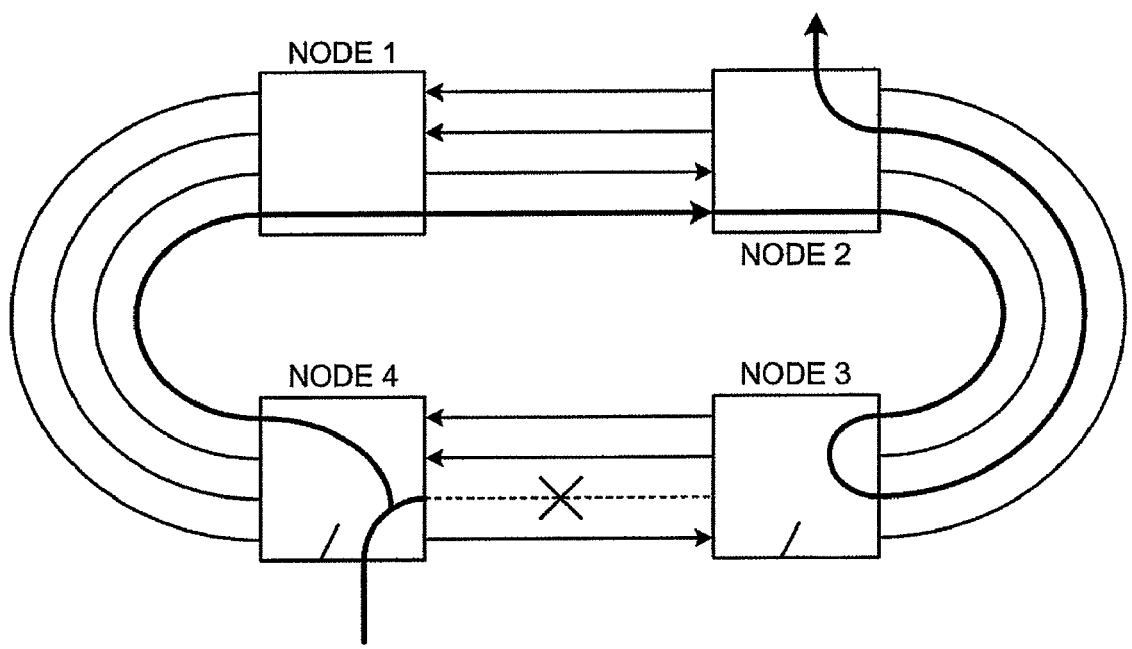
Figure 9:
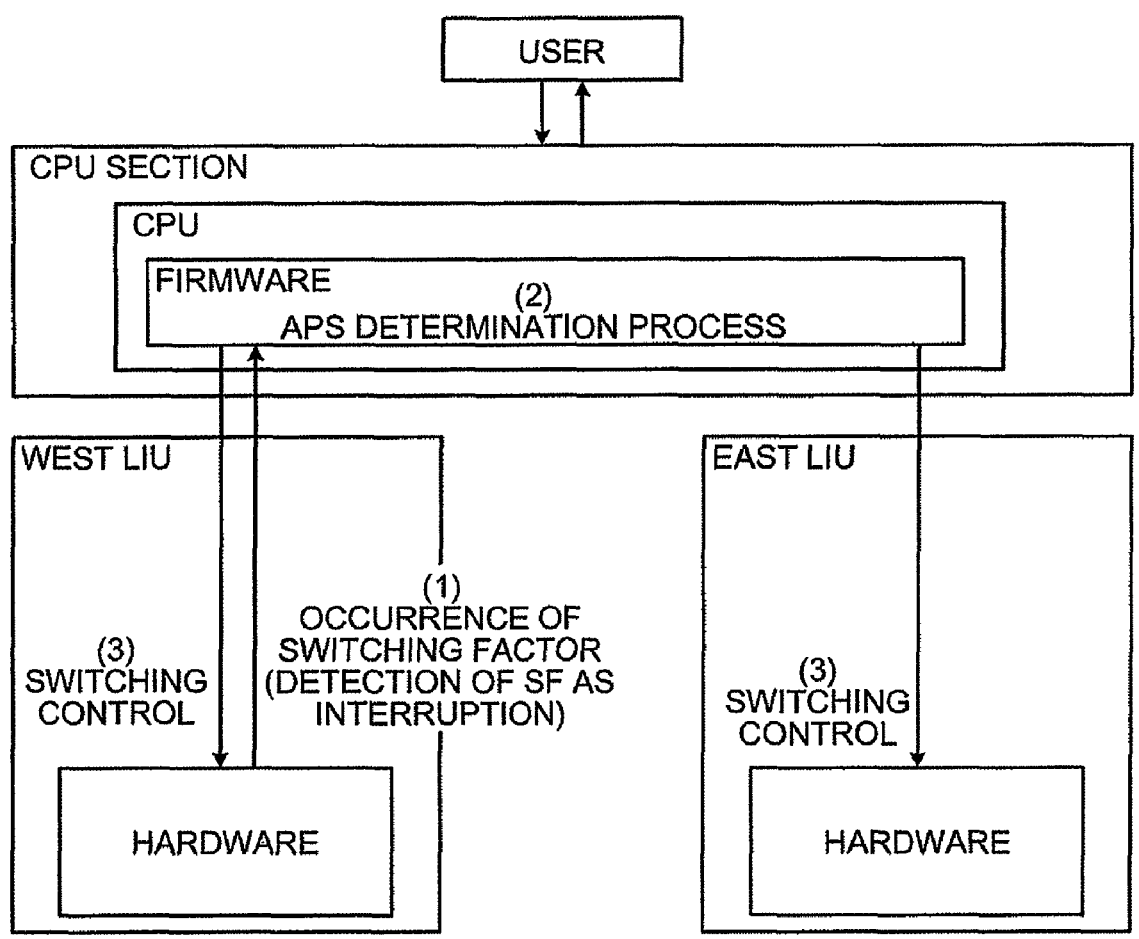
FIG. 9 is a schematic of a centralized CPU architecture.

Referring to FIGS. 4A, 4B, 5A, 5B, 6A and 6B, the following describes processes performed by the optical transmission apparatus according to the first embodiment. FIGS. 4A, 4B, 5A and 5B are charts of processes starting from setting to normal operation in the optical transmission apparatus according to the first embodiment. FIGS. 6A and 6B are charts of processes starting from the concurrent occurrence of failures on a plurality of ports to switching control in the optical transmission apparatus according to the first embodiment.

When a user of the optical transmission apparatus 100 according to the first embodiment inputs to the CPU 1 a setting of the first port of the first LIU 3 available for the BLSR (Step S401), the user I/F unit 2 transfers the received setting information to the first LIU 3 (Step S402), and the first I/F unit 5 of the first LIU 3 transfers the setting information to the setting control receiving unit 11 (Step S403).

The setting control receiving unit 11, when receiving the setting information (Step S404), stores therein the received setting information (Step S405) while commanding the inter-firmware communicating unit 7 to notify the received setting information to the second LIU 20 (Step S406). Accordingly, the inter-firmware communicating unit 7 notifies the setting information to an inter-firmware communicating unit 24 (Step S407).

The inter-firmware communicating unit 24, when receiving the setting information from the inter-firmware communicating unit 7, transfers the setting information to a setting control receiving unit 28 (Step S408). The setting control receiving unit 28 receives the setting information (Step S409), and stores therein the received setting information (Step S410).

In this way, the firmware 4 installed in the CPU of the first LIU 3 stores therein information that the first port of the first LIU 3 has been registered as a port dedicated to the BLSR. By firmware communication, the firmware 21 installed in the CPU of the second LIU 20 operates to receive and store therein the information that the first port of the first LIU 3 has been registered as a port dedicated to the BLSR.

When a user of the optical transmission apparatus 100 according to the first embodiment inputs to the CPU 1 a setting of the first port of the second LIU 20 available for the BLSR (Step S411), the user I/F unit 2 transfers the received setting information to the second LIU 20 (Step S412), and a second I/F unit 22 of the second LIU 20 transfers the setting information to the setting control receiving unit 28 (Step S413).

The setting control receiving unit 28, when receiving the setting information (Step S414), stores therein the received setting information (Step S415) while commanding the inter-firmware communicating unit 24 to notify the received setting information to the first LIU 3 (Step S416). Accordingly, the inter-firmware communicating unit 24 notifies the setting information to the inter-firmware communicating unit 7 (Step S417).

The inter-firmware communicating unit 7, when receiving the setting information from the inter-firmware communicating unit 24, transfers the setting information to the setting control receiving unit 11 (Step S418). The setting control receiving unit 11 receives the setting information (Step S419), and stores therein the received setting information (Step S420).

In this way, the firmware 21 installed in the CPU of the second LIU 20 stores therein information that the first port of the second LIU 20 has been registered as a port dedicated to the BLSR. By firmware communication, the firmware 4 installed in the CPU of the first LIU 3 stores therein the information that the first port of the second LIU 20 has been registered as a port dedicated to the BLSR.

The setting control receiving unit 28, having received and stored therein the information that the first port of the second LIU 20 has been registered as a port dedicated to the BLSR, sends the setting information to a CPU master-slave determining unit 25 (Step S421). The CPU master-slave determining unit 25 receives the information that the first port of the second LIU 20 has been registered as a port dedicated to the BLSR (Step S422), and determines, by referring to the master-slave management storing unit 250, a master-slave relationship at the first port of the CPU containing the firmware 21, so as to perform switching (Step S423).

Specifically, the CPU master-slave determining unit 25 determines, by referring to the master-slave management storing unit 250 shown in FIG. 3B, the CPU containing firmware 21 to be a slave CPU at the first port.

Concurrently, the setting control receiving unit 11, having received and stored therein the information that the first port of the first LIU 3 has been registered as a port dedicated to the BLSR, sends the setting information to the CPU master-slave determining unit 8 (Step S424). The CPU master-slave determining unit 8 receives the information that the first port of the first LIU 3 has been registered as a port dedicated to the BLSR (Step S425), and determines, by referring to the master-slave management storing unit 80, a master-slave relationship at the first port of the CPU containing the firmware 4, so as to perform switching (Step S426).

Specifically, the CPU master-slave determining unit 8 determines, by referring to the master-slave management storing unit 80 shown in FIG. 3A, the CPU containing the firmware 4 to be a master CPU at the first port.

The CPU master-slave determining unit 8 then sends the determination result to the hardware master-slave switching unit 16 (Step S427). In response to the determination result, the hardware master-slave switching unit 16 performs switching of the hardware 14 (Step S428).

Specifically, because the CPU containing the firmware 4 is determined to be a master CPU, the hardware master-slave switching unit 16 in the hardware 14 switches the hardware 14 to be master hardware at the first port.

The CPU master-slave determining unit 8, having determined that the first port of the CPU containing the firmware 4 to be a master CPU, commands the inter-firmware communicating unit 7 to provide the second LIU 20 with a notification for switching a master-slave relationship (Step S429). The inter-firmware communicating unit 7 sends the switching notification to the inter-firmware communicating unit 24 (Step S430), the inter-firmware communicating unit 24 transfers the received switching notification to the CPU master-slave determining unit 25 (Step S431), and the CPU master-slave determining unit 25 transfers the switching notification to a hardware master-slave switching unit 33 (Step S432).

The hardware master-slave switching unit 33, when receiving the switching notification from the CPU master-slave determining unit 25, performs switching of the hardware 31 (Step S433). Specifically, the hardware master-slave switching unit 33 in the hardware 31 switches the hardware 31 to be slave hardware at the first port.

The processes at Steps S401 to S433 are performed also in setting the second to the fourth ports available for the BLSR.

When a user of the optical transmission apparatus 100 according to the first embodiment inputs to the CPU 1 a setting of a fifth port of the first LIU 3 available for the BLSR (Step S501), the user I/F unit 2 transfers the received setting information to the first LIU 3 (Step S502), and the first I/F unit 5 of the first LIU 3 transfers the setting information to the setting control receiving unit 11 (Step S503).

The setting control receiving unit 11, when receiving the setting information (Step S504), stores therein the received setting information (Step S505) while commanding the inter-firmware communicating unit 7 to notify the received setting information to the second LIU 20 (Step S506). Accordingly, the inter-firmware communicating unit 7 notifies the setting information to the inter-firmware communicating unit 24 (Step S507).

The inter-firmware communicating unit 24, when receiving the setting information from the inter-firmware communicating unit 7, transfers the setting information to the setting control receiving unit 28 (Step S508). The setting control receiving unit 28 receives the setting information (Step S509), and stores therein the received setting information (Step S510).

In this way, the firmware 4 installed in the CPU of the first LIU 3 stores therein information that the fifth port of the first LIU 3 has been registered as a port dedicated to the BLSR. By firmware communication, the firmware 21 installed in the CPU of the second LIU 20 receives and stores therein the information that the fifth port of the first LIU 3 has been registered as a port dedicated to the BLSR.

When a user of the optical transmission apparatus 100 according to the first embodiment inputs to the CPU 1 a setting of the fifth port of the second LIU 20 available for the BLSR (Step S511), the user I/F unit 2 transfers the received setting information to the second LIU 20 (Step S512), and the second I/F unit 22 of the second LIU 20 transfers the setting information to the setting control receiving unit 28 (Step S513).

The setting control receiving unit 28, when receiving the setting information (Step S514), stores therein the received setting information (Step S515) while commanding the inter-firmware communicating unit 24 to notify the received setting information to the first LIU 3 (Step S516). Accordingly, the inter-firmware communicating unit 24 notifies the setting information to the inter-firmware communicating unit 7 (Step S517).

The inter-firmware communicating unit 7, when receiving the setting information from the inter-firmware communicating unit 24, transfers the setting information to the setting control receiving unit 11 (Step S518). The setting control receiving unit 11 receives the setting information (Step S519), and stores therein the received setting information (Step S520).

In this way, the firmware 21 installed in the CPU of the second LIU 20 stores therein information that the fifth port of the second LIU 20 has been registered as a port dedicated to the BLSR. By firmware communication, the firmware 4 installed in the CPU of the first LIU 3 receives and stores therein the information that the fifth port of the second LIU 20 has been registered as a port dedicated to the BLSR.

The setting control receiving unit 11, having received and stored therein the information that the fifth port of the first LIU 3 has been registered as a port dedicated to the BLSR, sends the setting information to the CPU master-slave determining unit 8 (Step S521). The CPU master-slave determining unit 8 receives the information that the fifth port of the first LIU 3 has been registered as a port dedicated to the BLSR (Step S522), and determines, by referring to the master-slave management storing unit 80, a master-slave relationship at the fifth port of the CPU incorporating the firmware 4, so as to perform switching (Step S523).

Specifically, the CPU master-slave determining unit 8 determines, by referring to the master-slave management storing unit 80 shown in FIG. 3A, the CPU containing the firmware 4 to be a slave CPU at the fifth port.

Concurrently, the setting control receiving unit 28, having received and stored therein the information that the fifth port of the second LIU 20 has been registered as a port dedicated to the BLSR, sends the setting information to the CPU master-slave determining unit 25 (Step S524). The CPU master-slave determining unit 25 receives the information that the fifth port of the second LIU 20 has been registered as a port dedicated to the BLSR (Step S525), and determines, by referring to the master-slave management storing unit 250, a master-slave relationship at the fifth port of the CPU containing the firmware 21, so as to perform switching (Step S526).

Specifically, the CPU master-slave determining unit 25 determines, by referring to the master-slave management storing unit 250 shown in FIG. 3B, the CPU containing the firmware 21 to be a master CPU at the fifth port.

The CPU master-slave determining unit 25 sends the determination result to the hardware master-slave switching unit 33 (Step S527). In response to the determination result, the hardware master-slave switching unit 33 performs switching of the hardware 31 (Step S528).

Specifically, because the CPU containing the firmware 21 is determined to be a master CPU, the hardware master-slave switching unit 33 in the hardware 31 switches the hardware 31 to be master hardware at the fifth port.

The CPU master-slave determining unit 25, having determined that the fifth port of the CPU containing the firmware 21 to be a master CPU, commands the inter-firmware communicating unit 24 to provide the first LIU 3 with a notification for switching a master-slave relationship (Step S529). The inter-firmware communicating unit 24 sends the switching notification to the inter-firmware communicating unit 7 (Step S530), the inter-firmware communicating unit 7 transfers the received switching notification to the CPU master-slave determining unit 8 (Step S531), and the CPU master-slave determining unit 8 transfers the switching notification to the hardware master-slave switching unit 16 (Step S532).

The hardware master-slave switching unit 16, when receiving the switching notification from the CPU master-slave determining unit 8, performs switching of the hardware 14 (Step S533). Specifically, the hardware master-slave switching unit 16 in the hardware 14 switches the hardware 14 to be slave hardware at the fifth port.

The processes at Steps S501 to S533 are performed also in setting the sixth to the eighth ports available for the BLSR.

Accordingly, all the ports are set available for the BSLR, and the CPU performing switching control at each port is distributed to the first LIU 3 and the second LIU 20, allowing the apparatus to be in normal operational state.

Assume that the process at Step S533 shown in FIG. 5 is complete at the eighth port and the normal operational state comes back in the optical transmission apparatus 100 according to the first embodiment. In this state, when the failure monitoring unit 19 of the first LIU 3 receives and stores therein failure information from all the first to the eighth ports of the EAST port group 200 (Step S601), the failure monitoring unit 19 commands the inter-hardware communicating unit 17 to transfer the received failure information to the second LIU 20 (Step S602), and the inter-hardware communicating unit 17 transfers the received failure information to the inter-hardware communicating unit 34 (Step S603).

The inter-hardware communicating unit 34, when receiving the failure information transferred from the inter-hardware communicating unit 17 (Step S604), transfers the failure information to the failure monitoring unit 36 (Step S605). The failure monitoring unit 36 stores therein the failure information received from the first LIU 3 (Step S606).

For example, the failure monitoring unit 19 of the first LIU 3, when receiving APS information of signal failure (SF) from all the first to the eighth ports of the EAST port group 200, stores therein the SF information while sending the SF information to the failure monitoring unit 36 of the second LIU 20 by inter-hardware communication. The second LIU 20 stores in the failure monitoring unit 36 the failure information received from the first LIU 3, and updates it. As a result, the same failure information is stored in the failure monitoring units 19 and 36.

Concurrently with the reception of the failure information at the failure monitoring unit 19 of the first LIU 3 at Step S601, the interruption trigger detecting unit 18 of the first LIU 3 detects from the ports the same information as the failure information received at and stored in the failure monitoring unit 19. The interruption trigger detecting unit 18 then sends to the interruption receiving unit 13 and the inter-hardware communicating unit 17 an interruption notification notifying that the failure information has been interrupted (Step S607).

The inter-hardware communicating unit 17 transfers the received interruption notification to the inter-hardware communicating unit 34 of the second LIU 20 equipped with a master CPU (Step S608). The inter-hardware communicating unit 34 receives the interruption notification (Step S609), and transfers it to the interruption trigger detecting unit 35 (Step S610).

The interruption trigger detecting unit 35 detects the interruption notification from the inter-hardware communicating unit 34, and sends it to an interruption receiving unit 30 (Step S611). In response to the interruption notification, the interruption receiving unit 30 collects the failure information at the fifth to the eighth ports from the failure monitoring unit 36, by referring to the master-slave management storing unit 250 (Step S612). The interruption receiving unit 30 then notifies the collected failure information to a trigger detecting unit 29 and requests switching (Step S613).

The trigger detecting unit 29 receives the failure information collected by the interruption receiving unit 30, and determines switching based on the received failure information (Step S614). Specifically, the trigger detecting unit 29 determines to switch the working line to the protection line.

The trigger detecting unit 29 notifies the result of the switching determination to a switch controlling unit 27 (Step S615). The switch controlling unit 27, when receiving the result of the switching determination (Step S616), provides a command for controlling switching to a switching control register 32 (Step S617), and the switching control register 32 performs switching according to the command from the switch controlling unit 27 (Step S618). Specifically, the switching control register 32 performs switching at the fifth to the eighth ports according to the command from the switch controlling unit 27, so as to receive an optical signal over the protection line.

The interruption receiving unit 13, when receiving the interruption notification from the interruption trigger detecting unit 18, collects the failure information at the first to the fourth ports from the failure monitoring unit 19 by referring to the master-slave management storing unit 80 (Step S619). The interruption receiving unit 13 then notifies the collected failure information to the trigger detecting unit 12 and requests switching (Step S620).

The trigger detecting unit 12 receives the failure information collected by the interruption receiving unit 13, determines switching based on the received failure information (Step S621), and notifies a result of the switching determination to the switch controlling unit 10 (Step S622). The switch controlling unit 10, when receiving the result of the switching determination (Step S623), provides the switching control register 15 with a command for controlling switching (Step S624), and the switching control register 15 performs switching according to the command from the switch controlling unit 10 (Step S625). Specifically, the switching control register 15 performs switching at the first to the fourth ports according to the command from the switch controlling unit 10, so as to receive an optical signal over the protection line.

If the firmware 4 of the first LIU 3 has completed switching control at the first to the fourth ports but switching control at the fifth to the eighth ports has not been completed by the firmware 21 of the second LIU 20, the firmware 4 of the first LIU 3 continues to perform the switching control at the fifth to the eighth ports. If the firmware 21 of the second LIU 20 has completed switching control at the fifth to the eighth ports but switching control at the first to the fourth ports has not been completed by the firmware 4 of the first LIU 3, the firmware 21 of the second LIU 20 continues to perform the switching control at the first to the fourth ports.

As described, according to the first embodiment, a master CPU mounted on a redundant LIU and determining switching control of redundant lines is distributed to a plurality of ports. Further, a CPU installed in a line card neighboring to the line card installed with the CPU set as a master CPU at a predetermined port is set as a slave CPU at the predetermined port. This arrangement prevents, even when failure information included in APS bytes is received from all the ports for example, excess switching control on only either one of the redundant LIUs because the master CPU is distributed to the ports. Thus, switching can be performed quickly to respond to failures concurrently occurring on the ports.

According to the first embodiment, a CPU set as a master CPU dominantly determines switching control based on failure information from ports corresponding to the master CPU. For example, the master CPU can, if it has completed switching control at ports corresponding to the master CPU but switching control at the ports corresponding to a master CPU of a neighboring LIU has not been completed, continue to perform the switching control not completed at the ports or other efficient settings, as a slave CPU. Thus, switching can be performed quickly to respond to failures concurrently occurring on the ports.

According to the first embodiment, between pieces of hardware mounted on redundant LIUs, hardware in one redundant LIU communicates obtained failure information to hardware in the other LIU. This arrangement allows high speed transmission of failure information included in APS bytes, compared with transmission between CPUs (pieces of firmware) in redundant LIUs. Thus, switching can be performed quickly to respond to failures concurrently occurring on ports.

According to the first embodiment, hardware mounted on each of the redundant LIUs stores therein obtained failure information, and failure information received from hardware in a neighboring LIU. This arrangement allows sharing of failure information included in APS bytes and held in a neighboring LIU, while updating the information to new failure information by faster inter-hardware communication. Thus, switching can be performed quickly and properly for failures concurrently occurring on ports.

According to the first embodiment, a CPU set as a master CPU at a predetermined port sets: hardware working under the master CPU to be master hardware at the predetermined port; and hardware working under a CPU determined as a slave CPU at the predetermined port to be slave hardware at the predetermined port. Further, the CPU set as the master CPU at the predetermined port controls the hardware set as the master hardware to switch redundant lines, allowing the master CPU to dominantly control switching. Thus, switching can be performed quickly and properly for failures concurrently occurring on ports.

By inter-hardware communication, in the optical transmission apparatus according to the first embodiment, the processing time shown in FIG. 6 starting from concurrent occurrence of failures on a working line to switching control can be reduced to half that of a conventional optical transmission apparatus of a distributed CPU architecture shown in FIG. 10, which starts from the concurrent occurrence of failures on a working line to switching control.

Although the foregoing describes the optical transmission apparatus according to the first embodiment, the present invention may be practiced in various forms other than the first embodiment. The following describes different arrangements (1) and (2) of an optical transmission apparatus according to a second embodiment.

(1) LIU Communication

The first embodiment describes that inter-hardware communication is used to share and update failure information between redundant LIUs. The present invention is not limited to this arrangement, and may be such that firmware communication is used to share and update failure information between redundant LIUs.

(2) System Configuration

As to the processes described in the first embodiment as being performed automatically, all of or part of the processes may be performed manually (a master-slave relationship of CPUs is set by receiving a setting of a master-slave relationship input by a user, not by referring to the master-slave management storing unit 80). Alternatively, as to the processes described as being performed manually, all of or part of the processes may be performed automatically by known methods. In addition, the processing procedures, specific names, various types of data and parameters, and other kinds of information shown in the embodiments and the drawings may be changed in any way unless otherwise specified.

Further, constituting elements of each apparatus shown in the drawings indicate ideational functions, and their physical arrangements are not necessarily the same as those shown in the drawings. Thus, the arrangement of distributing and integrating the processing units and storing units is not limited to those specifically shown in the drawings (e.g., arrangement shown in FIG. 2), and all of or part of those units may be distributed and integrated concerning functional and physical aspects based on given units, with loads on and usage of the units taken into account. For example, the interruption trigger detecting unit 18 and the failure monitoring unit 19 may be integrated. As to the processing functions implemented in the units, all of or any portion of the functions may be implemented by CPUs and programs interpretable and executable by the CPUs, or may be implemented in hardware using wired logic.

An optical transmission apparatus according to the embodiments of the present invention may be realized by implementing a prepared program on a computer or a workstation. The program may be distributed over a network such as the Internet. Further, the program may be implemented by being recorded to a computer-readable recording medium, such as a hard disk, a flexible disk (FD), a compact disk read only memory (CD-ROM), a magnet optical disk (MO), or a digital versatile disk (DVD), and then by being read out from such a recording medium with a computer.

According to the embodiment of the present invention, a master CPU mounted on a redundant line card and determining switching control of redundant lines is distributed to a plurality of ports. Further, a CPU in a line card neighboring to the line card installed with the CPU set as a master CPU at a predetermined port is set as a slave CPU at the predetermined port. This arrangement prevents, even when failure information included in APS bytes is received from all the ports for example, excess switching control on only either one of redundant line cards because the master CPU is distributed to the ports. Thus, switching can be performed quickly to respond to failures concurrently occurring on the ports.

According to the embodiment of the present invention, a CPU set as a master CPU dominantly determines switching control based on failure information from ports corresponding to the CPU. For example, the master CPU can, if it has completed switching control at ports corresponding to the master CPU but switching control at the ports corresponding to a master CPU of a neighboring line card has not been completed, continue to perform the switching control not completed at the ports or other efficient settings as a slave CPU. Thus, switching can be performed quickly to respond to failures concurrently occurring on the ports.

According to the embodiment of the present invention, between pieces of hardware mounted on the redundant line cards, hardware in one redundant line card communicates obtained failure information to hardware in the other line card. This arrangement allows high speed transmission of failure information included in APS bytes, compared with transmission between CPUs (pieces of firmware) in the redundant line cards. Thus, switching can be performed quickly to respond to failures concurrently occurring on ports.

According to the embodiment of the present invention, hardware mounted on each of the redundant line cards stores therein obtained failure information, and failure information received from hardware in a neighboring line card. This arrangement allows sharing of failure information included in APS bytes and held in a neighboring line card, while updating the information to new failure information by faster inter-hardware communication. Thus, switching can be performed quickly and properly for failures concurrently occurring on ports.

According to the embodiment of the present invention, a CPU set as a master CPU at a predetermined port sets: hardware working under the master CPU to be master hardware at the predetermined port; and hardware working under a CPU determined as a slave CPU at the predetermined port to be slave hardware at the predetermined port. Further, the CPU set as the master CPU at the predetermined port controls the hardware set as the master hardware to switch redundant lines, allowing the master CPU to dominantly control switching. Thus, switching can be performed quickly and properly for failures concurrently occurring on ports.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical transmission apparatus for transmitting an optical SDH/SONET signal in a ring network, comprising:
   a first line card and a second line card, each including a plurality of ports connected to a redundant line having a working line and a protection line, a hardware unit, a CPU, and a master-slave CPU distribution setting unit, wherein
   the hardware unit obtains failure information on the redundant line for each of the ports,
   the CPU determines switching control of the redundant line for each of the ports based on the failure information obtained by the hardware unit, and thereby the hardware unit switches the redundant line based on the switching control determined by the CPU, and
   the master-slave CPU distribution setting unit sets the CPU of one of the first line card and the second line card as a master CPU that determines the switching control of the redundant line, and sets the CPU of the other of the first line card and the second line as a slave CPU, for each set of the ports.

2. The optical transmission apparatus according to claim 1, wherein
   the master-slave CPU distribution setting unit sets that the master CPU dominantly determines switching control based on the failure information from the port corresponding to the master CPU.

3. The optical transmission apparatus according to claim 2, wherein
   each of the first line card and the second line card includes an inter-hardware communicating unit that inter-hardware communicating unit that communicates, from the hardware unit of one of the first line card and the second line card to the hardware unit of the other of the first line card and the second line card, the failure information obtained by the hardware of the one of the first line card and the second line card.

4. The optical transmission apparatus according to claim 3, wherein
   each of the first line card and the second line card includes an obtained failure information storing unit that stores therein the failure information obtained by the hardware unit, and
   the inter-hardware communicating unit stores in the obtained failure information storing unit the failure information received from the hardware unit.

5. The optical transmission apparatus according to claim 4, further comprising:
   a hardware master-slave setting unit that sets the hardware unit working under the master CPU to be a master hardware unit at the corresponding port and sets the hardware unit working under the slave CPU to be a slave hardware unit at the corresponding port; and
   a switch controlling unit that controls the master hardware unit defined by the hardware master-slave setting unit to switch the redundant line.

* * * * *